Oct. 17, 1961 H. A. O'BRIEN 3,005,189

INTERRECORD NOISE ELIMINATION

Filed Feb. 17, 1958 2 Sheets-Sheet 1

INVENTOR
HUGH A. O'BRIEN

BY [signature]

ATTORNEY

Oct. 17, 1961 H. A. O'BRIEN 3,005,189

INTERRECORD NOISE ELIMINATION

Filed Feb. 17, 1958 2 Sheets-Sheet 2

INVENTOR
HUGH A. O'BRIEN

BY [signature]
ATTORNEY

United States Patent Office 3,005,189

Patented Oct. 17, 1961

3,005,189

INTERRECORD NOISE ELIMINATION

Hugh A. O'Brien, Wappingers Falls, N.Y., assignor to International Business Machines Corporation, New York, N.Y., a corporation of New York Filed Feb. 17, 1958, Ser. No. 715,641
7 Claims. (Cl. 340—174.1)

This invention relates to a system for avoiding the effect of noise encountered in the interrecord space of magnetically recorded data tapes.

A number of tape defects such as random flakes of oxide, tape breaks, and the like, will cause the generation of spurious signals when a magnetic data tape is being read into a computer or a data processing system. These spurious signals are commonly referred to as "noise." Noise causing defects may appear in normal course in the interrecord space on the tape, or they may be purposely relegated to the interrecord space when the record is originally written by utilizing known recording techniques effective for the purpose.

The invention herein permits interrecord noise to be ignored when reading tape, and thereby prevents error indications, tape spacing problems, and other difficulties which are ordinarily initiated by such noise. The invention is predicated on the phenomenon that tape generated noise almost always appears as redundantly invalid signals in tape reading systems, when such signals are subjected to an even redundancy check. By reason of the stated phenomenon, data transmission circuits can be so conditioned that they will respond only upon the reading of a redundantly valid character.

The specific nature of the system herein can be understood best by reference to the attached drawings, in which.

Figure 1:
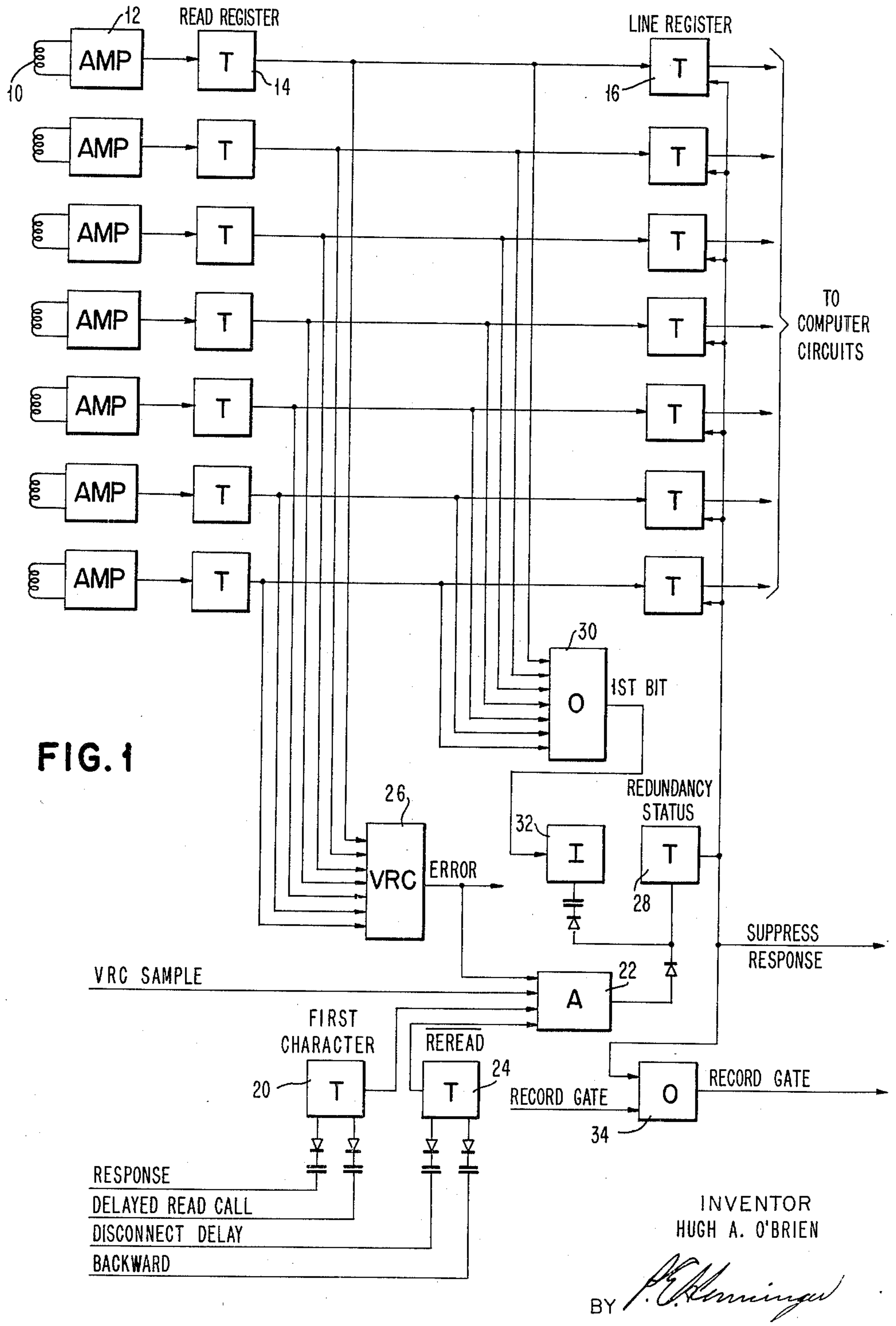
FIG. 1 is a circuit diagram of the necessary components constituting the noise suppression system.

Tape reading equipment ordinarily associated with electronic computers and electronic data processing systems involves a pair of character registers through which characters are transmitted from magnetic tape to the processing circuits. Alternately, the tape reading circuits, if in a module separate from the processing circuits, may involve a so-called read register while the processing system may have a so-called line register. Two or more registers are ordinarily employed to overcome problems arising from tape skew. In the system herein, data from magnetic record tape is read character-by-character into a read register such that skew affected bits comprising a character are available in the read register for simultaneous transfer to a line register. It is the purpose of this invention to avoid the transfer of interrecord noise or spurious signals from the read register to the line register. A suitable system for accomplishing this objective is shown in FIG. 1 to which reference may be had for an understanding of the interrelation of the components involved.

When a magnetic tape is read in a tape reading system a change in the flux pattern on the tape represents a bit of a coded character when such change in flux pattern is detected in the coils of tape reading heads 10. The pulse, represented as the tape signal in FIG. 3, generated in the coil 10 is amplified in an amplifier 12 and temporarily stored in a read register position which herein comprises a bi-stable trigger 14.

Figure 3:
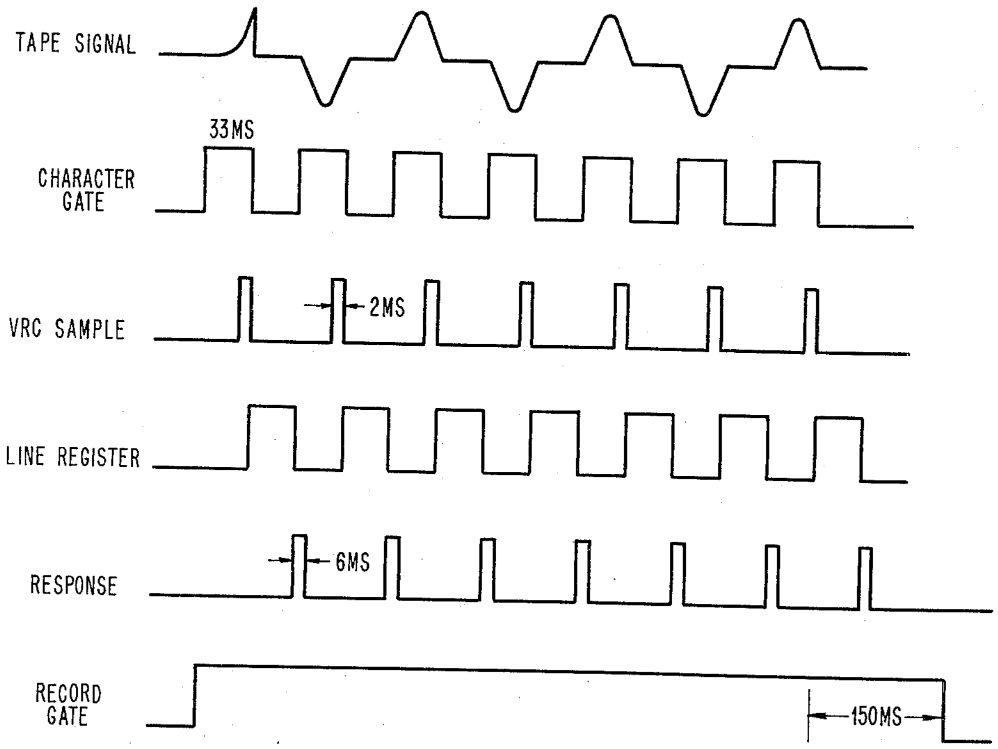
FIG. 3 is a timing diagram of certain of the signals utilized in the system.

Seven reading heads 10, associated amplifiers 12 and triggers 14 adapt the system herein to the reading of a tape having seven channels, one of which is reserved for the recording of a redundancy check bit. The number of reading heads, amplifiers and triggers will depend on the tape channel configuration to which the system is adapted. Tape pulses may arrive in the triggers 14 of the read register during the duration of a character gate which is a timed interval, represented in FIG. 3 by the line "character gate," initiated by the arrival in the read register of the first bit of a character read from tape. In one well known tape reader, the character gate is generated by a single shot multivibrator (not shown) having a 33 microsecond period, the multivibrator being tripped by the arrival of the first bit of each character at the read register. It is presumed that all of the bits comprising a character will be temporarily stored in the read register triggers 14 within 33 microseconds even under the worst conditions of skew. As shown in FIG. 3, the trailing edge of the character gate pulse can be used for resetting the read register triggers and to effectively transfer a character stored therein to a line register which herein is composed of a series of seven bi-stable triggers 16 which are set to their ON position when the corresponding read register triggers 14 are reset to their OFF position after having been set to their ON position by the arrival of a character bit. While receipt of character bits from tape in the read registers may be slightly serial in point of time within the duration of the character gate, the transfer of the bits comprising a character from the read register trigger 14 to their corresponding line register trigger 16 is simultaneous. The gating and resetting connections for the read register triggers and the line register triggers are well known in the art, as shown in detail in United States Patent 2,850,234, issued September 2, 1958 on the application of John E. Bartelt and Max E. Femmer, and since they form no essential part of this invention, they are not shown in the drawings and need not be described beyond the above brief description which is desirable for rendering the following description of the invention more intelligible.

Figure 2:
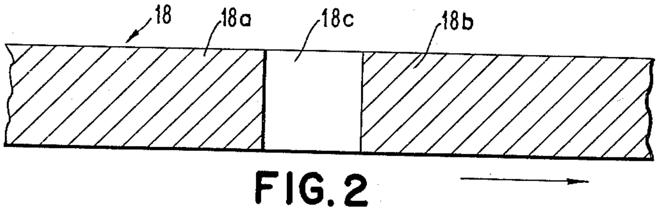
FIG. 2 is a diagrammatic representation of a short length of magnetic tape having records thereon.

The magnetic record tape 18 of FIG. 2 diagrammatically depicts a pair of records **18*a* and 18*b* spaced from each other by a gap 18*c*, known as an interrecord space. The length of the records 18*a* and 18*b* may vary as required by the type of information stored therein, while the length of the interrecord space 18*c* will vary in accordance with the design of the tape recording equipment employed for generating the record. In conventional recording equipment, the interrecord space 18*c*** is of the order of ¾ of 1 inch. Noise within a record is especially troublesome because of spacing problems resulting therefrom in tape reading equipment which is commonly adapted to backspace and reread records which are indicated to the system as being redundantly invalid. As a consequence of the difficulties encountered, equipment has been designed, as stated, for deliberately relegating tape defects and noise generally to the interrecord space on the tape where it can be dealt with more effectively. Whether or not tape pulses received from a tape are redundantly valid or invalid is conventionally determined by making a so-called redundancy count of the pulses received from the tape. For example, resort may be had to an even redundancy count which requires that whenever a character consisting of an odd number of bits is recorded on the tape, an additional bit will be recorded in the redundancy check bit channel of the tape such that the count of bits of a character so recorded across the tape is even. When thereafter reading from tape which has been so recorded, the bits received at the read register for the successive characters being read are counted, the counter in a redundancy bit counter will produce an error output whenever the number of bits counted for any character therein is odd. This invention takes advantage of the error output of a vertical redundancy bit counter for its effectiveness.

Assume that the tape 18 is to be read as an input to an electronic computer or other electronic data processing system, an instruction will be provided to the tape reader to cause the tape reading equipment to proceed to read a record from tape therein. Herein the signal Delayed Read Call appears shortly after the tape unit receives a command to read tape. The signal Delayed Read Call turns ON a first character trigger 20 which conditions one input to an AND circuit 22. A second input to the AND circuit 22 is the output from the left side of a reread trigger 24. Since the instruction to read implies a forward direction, the reread trigger 24 will be OFF by reason of the fact that the reread operation succeeds a backward direction of tape. Therefore, since the signal Backward which is one input to the reread trigger 24 and which results from the reread instruction is absent, the reread trigger 24 will be in its reset position such that the output of the left side of the trigger which is the signal $\overline{\text{Reread}}$ conditions the second input to the AND circuit 22. The signal Backward will result from the reread instruction and it falls on the completion of a tape back spacing operation. The fall of the signal Backward turns ON the reread trigger, which, in turn, voids the function of this invention during other than the first read of any record. As will be explained, this is desirable in the event that the first character of a true record be redundantly invalid. A third input to the AND circuit 22 is the output of a conventionally vertical redundancy bit counter 26. It will be seen that the output of each trigger 14 of the read register constitutes an input to the vertical redundancy bit counter 26 such that any signal from the several channels of the tape will be received at the vertical redundancy bit counter 26 and since it is presumed that a valid character will always contain an even number of bits, the vertical redundancy bit counter 26 will produce an error output signal whenever an odd number of bits are received therein. Therefore, upon the reading of an odd number of bits, which, as stated above, is the case with almost all noise read from tape in the interrecord space, the vertical redundancy bit counter 26 will condition the third input to the AND circuit 22.

A signal VRC Sample, represented in FIG. 3 by the line which is so labeled is a short pulse which appears at the fall of the character gate signal, mentioned above, is the fourth and final input to the AND circuit 22. It can be seen, therefore, that if a redundantly invalid count in the read register is detected in the redundancy bit counter, the AND circuit 22 will emit a signal, since each of its four inputs is positive, and thereby will turn ON a redundancy status trigger 28 such that the redundancy status trigger will conduct on its left side and the potential on its right side therefore will be high. The potential from the right side of the redundancy status trigger 28 can be used in a number of ways to suppress operation of the triggers 16 of the line register which would normally result upon the resetting of the read register triggers. For example, this potential can be applied to the right control grids of the line register triggers 16, as indicated, such that when an effort is made to gate bits stored in triggers 14 of the read register into the triggers of the line register, the triggers of the line register will remain unaffected. It can be seen, therefore, that spurious signals received in the read register as first characters will be prevented from going to the line register and, therefore, into computing or processing circuits of the system.

The output lines from the read register triggers 14 comprise individual inputs also to an OR circuit 30 such that the first bit of a suceeding character received in the read register triggers 14 will cause an output from the OR circuit 30 to turn the redundancy status trigger 28 OFF. Reversal of the redundancy status trigger 28 is caused by a negative pulse to its reset input. Therefore, the output of the OR circuit 30, representing the first bit of a succeeding character, is passed through an inverter 32 thereby providing an inverted output connected to the redundancy status trigger 28 which will effectively turn OFF the redundancy status trigger.

Certain related operations of the system must be considered. A signal Record Gate, represented by the last line of FIG. 3, is commonly utilized in systems such as those to which this invention pertains. The signal Record Gate is used to identify and indicate the receipt of a complete record from tape being read and its duration is predicated on the assumption that characters comprising a given record on tape will arrive at the tape reading heads within a given maximum interval between characters. Thus, in a conventional system, the signal Record Gate is produced by a holdover single shot multivibrator having a period of 150 microseconds, for example. This multivibrator is triggered by the receipt of pulses from tape and is held over so long as tape pulses are received every 150 microseconds or less, as in the above-identified Bartelt and Femmer patent. In the present system, if the signal Record Gate is brought up by an invalid character, it will be held up until a valid character is sensed, at which time it will resume its normal function. The record gate signal produced by a device such as the holdover single shot multivibrator above mentioned is an input to an OR circuit 34 through which it passes as the signal Record Gate such that it may perform its conventional function. However, since a noise signal read in the interrecord space of a tape may be more than 150 microseconds removed from the next following signal, the signal record gate may be initiated by such noise signal and fall before the next signal is read. To provide for this contingency, the output of the redundancy status trigger 28 is also an input to the OR circuit 34 such that the trigger output can maintain the signal Record Gate until the next valid character is read.

Systems such as those contemplated herein, conventionally emit a timed pulse indicating that a given processing operation has been completed and the system is prepared for reading and processing of the next character. Herein, this conventional signal is the signal response, represented in FIG. 3 by the line so labeled, which is specifically used in the circuits of this invention for turning OFF the first character trigger 20. It is necessary that the signal Response be suppressed not only insofar as it may affect the first character trigger 20, but also as it may affect other functions during the operation of the system. The output of the redundancy status trigger 28 can be effectively employed in a conventional manner for suppressing the signal Response so long as the redundancy status trigger is turned ON. Therefore, the signal Suppress Response, which is an output of the redundancy status trigger 28, is provided for the purpose of preventing generation of the signal Response during this time.

Virtually all tape reading units associated with computers and data processing systems are designed to reverse tape direction, backspace, reverse again, then reread the questionable record whenever a redundantly invalid character is sensed. Therefore, in order to avoid disruption of the normal backspace and reread function and further to permit the full transmission of a record having such an invalid character in the first character position to the computing or processing circuits where a correction can be made, provision is made herein for disabling the interrecord noise suppression circuits under such conditions. The reread trigger 24 performs the function in question. The reread trigger 24 has as inputs the signal Disconnect Delay which indicates the completion of a read-write operation in the tape unit. This signal implies a forward direction of tape and serves to turn OFF the reread trigger 24. The other input to the reread trigger 24 is the signal Backward which results from an instruction to the tape transport equipment for rereading a record found to contain a redundantly invalid character. The signal Backward falls on completion of the tape back spacing operation and the fall thereof turns ON the reread trigger 24. It can be seen, therefore, that the output of the reread trigger 24 can be used to block operation of the system herein during the rereading of a record. This provides for the possibility of the first character of a true record being redundantly invalid. If an invalid character is sensed following one or more valid characters, such character may be stored and an error signal will be generated such that the invalid character so stored can be corrected.

While the fundamentally novel features of the invention have been illustrated and described in connection with the specific embodiment of the invention, it is believed that this embodiment will enable others skilled in the art to apply the principles of the invention in forms departing from the exemplary embodiment herein, and such departures are contemplated by the claims.

What is claimed is:

1. A magnetic tape reading system adapted to suppress the transmission of noise read from the space between records on the tape, a register system comprising a first character register for receiving pulses representing a character from a plurality of channels of the tape and a second character register, connections between said first and second character registers for transmitting character representing pulses from said first character register to said second character register, means for determining the redundancy count of pulses received from the tape in said first character register and for producing a first control signal when the redundancy count of said pulses indicates the presence of an invalid character in said first character register, means for generating a second control signal indicating the reading of a first character following the reading of each complete record from the tape, means for receiving as inputs thereto said first and second control signals, a test pulse input to said last mentioned means adapted to detect the simultaneous presence of said first and second control signals therein and for generating an output pulse upon the simultaneous presence therein of said first and second control signals, and connections between said last named means and said register system for transmitting said output pulse to said register system to block transmission of character representing pulses through said connections between said first and second character registers.

2. A magnetic tape reading system adapted to suppress the transmission of noise read from the space between records on the tape, a register system comprising a first character register for receiving pulses representing a character from a plurality of channels of the tape and a second character register, connections between said first and second character registers for transmitting character representing pulses from said first character register to said second character register, means for determining the redundancy count of pulses received from the tape in said first character register and for producing a first control signal when the redundancy count of said pulses indicates the presence of an invalid character in said first character register, means for generating a second control signal indicating the reading of a first character following the reading of each complete record from the tape, a coincidence circuit having as inputs thereto said first and second control signals, a test pulse input to said coincidence circuit for detecting the simultaneous presence of said first and second control signals therein and for generating an output pulse upon the simultaneous presence therein of said first and second control signals, and connections between said coincidence circuit and said register system for transmitting said output pulse to said register system to block transmission of character representing pulses through said connections between said first and second character registers.

3. A magnetic tape reading system adapted to suppress the transmission of noise read from the space between records on the tape, a register system comprising a first character register for receiving pulses representing a character from a plurality of channels of the tape and a second character register, connections between said first and second character registers for transmitting character representing pulses from said first character register to said second character register, means for determining the redundancy count of pulses received from the tape in said first character register and for producing a first control signal when the redundancy count of said pulses indicates the presence of an invalid character in said first character register, means for generating a second control signal indicating the reading of a first character following the reading of each complete record from the tape, a coincidence circuit having as inputs thereto said first and second control signals, a test pulse input to said coincidence circuit for detecting the simultaneous presence of said first and second control signals therein and for generating an output pulse upon the simultaneous presence therein of said first and second control signals, means connected to said coincidence circuit and responsive to the output therefrom for emitting a blocking potential upon input thereto of an output pulse of said coincidence circuit, and connections between said last named means and said register system for transmitting said blocking potential to said register system to block transmission of character representing pulses through said connections between said first and second character registers.

4. A magnetic tape reading system adapted to suppress the transmission of noise read from the space between records on the tape, a register system comprising a first character register for receiving pulses representing a character from a plurality of channels of the tape and a second character register, connections between said first and second character registers for transmitting character representing pulses from said first character register to said second character register, means for determining the redundancy count of pulses received from the tape in said first character register and for producing a first control signal when the redundancy count of said pulses indicates the presence of an invalid character in said first character register, means for generating a second control signal indicating the reading of a first character following the reading of each complete record from the tape, a coincidence circuit having as inputs thereto said first and second control signals, a test pulse input to said coincidence circuit for detecting the simultaneous presence of said first and second control signals therein and for generating an output pulse upon the simultaneous presence therein of said first and second control signals, connections between said coincidence circuit and said register system for transmitting said output pulse to said register system to block transmission of character representing pulses through said connections between said first and second character registers, and means responsive to a signal indicative of a tape back spacing operation adapted to render inoperative said coincidence circuit whereby the output pulse therefrom is suppressed.

5. A magnetic tape reading system adapted to suppress the transmission of noise read from the space between records on the tape, a register system comprising a first character register for receiving pulses representing a character from a plurality of channels of the tape and a second character register, connections between said first and second character registers for transmitting character representing pulses from said first character register to said second character register, means for determining the redundancy count of pulses received from the tape in said first character register and for producing a first control signal when the redundancy count of said pulses indicates the presence of an invalid character in said first character register, means for generating a second control signal indicating the reading of a first character following the reading of each complete record from the tape, means responsive to a signal indicating that the tape is being fed in a forward direction for generating a third control signal, a coincidence circuit having as inputs thereto said first, second and third control signals, a test pulse input to said coincidence circuit for detecting the simultaneous presence of said first, second and third control signals therein and for generating an output pulse upon the simultaneous presence therein of said first, second and third control signals, connections between said coincidence circuit and said register system for transmitting said output pulse to said register system to block transmission of character representing pulses through said connections between said first and second character registers, and means for suppressing generation of said third control signal upon application to said generating means thereof of a signal indicating that the tape is being fed in a backward direction.

6. A magnetic tape reading system adapted to suppress the transmission of noise read from the space between records on the tape, a register system comprising a first character register for receiving pulses representing a character from a plurality of channels of the tape and a second character register, connections between said first and second character registers for transmitting character representing pulses from said first character register to said second character register, means for determining the redundancy count of pulses received from the tape in said first character register and for producing a first control signal when the redundancy count of said pulses indicates the presence of an invalid character in said first character register, means for generating a second control signal indicating the reading of a first character following the reading of each complete record from the tape, a coincidence circuit having as inputs thereto said first and second control signals, a test pulse input to said coincidence circuit for detecting the simultaneous presence of said first and second control signals therein and for generating an output pulse upon the simultaneous presence therein of said first and second control signals, a bistable trigger having a first and a second state connected to said coincidence circuit for receiving an output pulse from said coincidence circuit whereby said trigger is set to its first state and thereby generates a blocking potential, connections between said bistable trigger and said register system for transmitting said blocking potential to said register system to block transmission of character representing pulses through said connections between said first and second character registers, and a second connection between said register system and said bistable trigger for setting said trigger to its second state.

7. A magnetic tape reading system adapted to suppress the transmission of noise read from the space between records on the tape, a register system comprising a first character register for receiving pulses representing a character from a plurality of channels of the tape and a second character register, connections between said first and second character registers for transmitting character representing pulses from said first character register to said second character register, means for determining the redundancy count of pulses received from the tape in said first character register and for producing a first control signal when the redundancy count of said pulses indicates the presence of an invalid character in said first character register, means for generating a second control signal indicating the reading of a first character following the reading of each complete record from the tape, a coincidence circuit having as inputs thereto said first and second control signals, a test pulse input to said coincidence circuit for detecting the simultaneous presence of said first and second control signals therein and for generating an output pulse upon the simultaneous presence therein of said first and second control signals, a bistable trigger having a first and second state connected to said coincidence circuit for receiving an output pulse from said coincidence circuit whereby said trigger is set to its first state and thereby generates a blocking potential, connections between said bistable trigger and said register system for transmitting said blocking potential to said register system to block transmission of character representing pulses through said connections between said first and second character registers, a second connection between said register system and said bistable trigger for setting said trigger to its second state, and means responsive to a signal indicative of a tape back spacing operation adapted to render inoperative said coincidence circuit whereby the output pulse therefrom is suppressed.

References Cited in the file of this patent

UNITED STATES PATENTS

| | | |
|---|---|---|
| 2,702,380 | Brustman | Feb. 15, 1955 |
| 2,706,215 | Van Duuren | Apr. 12, 1955 |